Nov. 28, 1933.　　　K. WEIHMANN　　　1,937,002
AUTOMATIC TRANSMISSION
Filed April 10, 1933　　2 Sheets-Sheet 1

INVENTOR.
KARL WEIHMANN.
BY
ATTORNEY.

Nov. 28, 1933.　　　K. WEIHMANN　　　1,937,002
AUTOMATIC TRANSMISSION
Filed April 10, 1933　　　2 Sheets-Sheet 2

INVENTOR.
KARL WEIHMANN.
BY Maxwell V. Hallace
ATTORNEY.

Patented Nov. 28, 1933

1,937,002

UNITED STATES PATENT OFFICE 1,937,002

AUTOMATIC TRANSMISSION

Karl Weihmann, Detroit, Mich.

Application April 10, 1933. Serial No. 665,373

17 Claims. (Cl. 74—34)

This invention relates to power transmissions wherein it is necessary to provide for changes in gear ratio between the power source and its point of application. A most common instance of the use of such mechanism is in the modern automobile.

An adaptation of my invention to an automobile transmission is described herein. It comprises means whereby a change in gear ratio can be effected automatically and without necessity of mechanical shifting and consequent clashing of the gears.

While my invention is particularly adapted to the automotive field, it will no doubt prove equally adaptable to other arts, as will be evident to persons skilled in the arts concerned.

Because of the novel features of my invention it is possible to attain extreme simplicity of design while retaining all the necessary functions and refinements so much desired.

With the foregoing and certain other objects and characteristics in view, which will readily be recognized from the following description, the invention consists in certain novel features in construction, and in combination and arrangements of elements as will be more fully and particularly referred to and specified hereinafter.

Referring to the accompanying drawings, in which similar reference characters refer to corresponding parts or elements throughout the several figures thereof.

Figure 1:
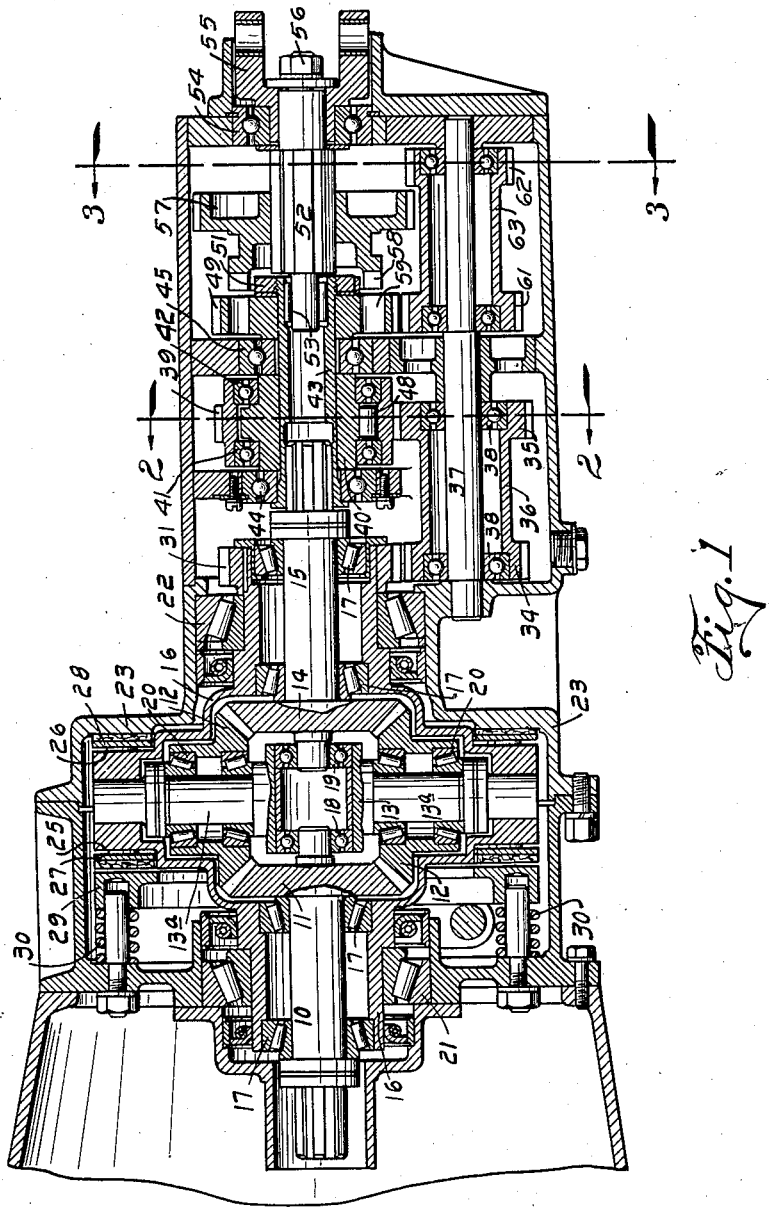
Fig. 1 shows a cross section of my transmission showing in entirety the novel combination of mechanical elements which comprises my invention.

An important unit of my transmission is a differential gear unit interposed between sections of the main drive shaft. The shaft 10 from the source of power is provided with bevel gear 11 meshing with bevel gears 12 rotatable on spider arms 13a. Gears 12 mesh also with bevel gear 14 which connects with shaft 15. The shafts 10 and 15 are rotatably mounted in housing 16 of the differential unit, four bearings 17 being provided. Two bearings 18 and 19 are also provided for support of the ends of shafts 10 and 15 in the spider 13. Likewise bearings 20 are provided on spider arms 13a for rotation of gears 12.

The spider 13 and gears 12 are carried by housing 16 and said housing is rotatably mounted on bearings 21 and 22, which are in turn supported by the main transmission housing 23. Housing 23 is suitably designed for assembly in several component parts as shown.

Near the outer periphery and on both sides of the differential housing 16, I provide flat surfaces 25 and 26 with annular clutch plates 27 and 28 in close proximity thereto. I also provide pressure plate 29 operable by spring units 30 to compress clutch plates 27 and 28 against differential housing 16 thereby preventing its rotation. Mechanism holding pressure plate 29 out of contact with the clutch plates to permit rotation of the differential unit is described in another portion of this specification.

A gear 31 is keyed to the rear extremity of the differential housing 16 for rotation therewith. This gear meshes with gear 32 rotatable on shaft 33 (see Fig. 2). The gear 32 meshes with gear 34 which is connected with gear 35 by sleeve 36, all rotating on countershaft 37, suitable bearings 38 being provided. The countershaft gear 35 meshes with gear 39. The gear 39 is mounted for rotation on member 40, being provided with bearings 41 and 42. Member 40 is keyed to hollow shaft 43. Said shaft 43 is attached by a conventional splined connection to shaft 15. Bearings 44 and 45 are provided for rotatable suspension of the shaft 43 on the main transmission housing 23.

Figure 2:
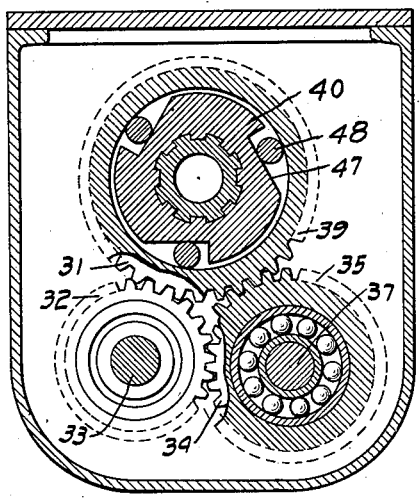
Fig. 2 is a section taken substantially on the line 2—2 of Fig. 1 and showing also a view of gearing directly forward of section 2—2.

The construction of gear 39 and member 40 between bearings 41 and 42 is shown in section on Fig. 2. The unit comprises a construction commonly referred to as an overrunning or free wheeling clutch. The member 40 has notches 47 in which ride rollers 48. The result is that when drive is applied to the teeth of gear 39 in a clockwise direction (as viewed in Fig. 2), the rollers 48 are driven to the narrow end of notches 47 and cause drive to be transmitted to member 40 and thereby to hollow shaft 43. However, if a driving force in clockwise direction is applied to member 40 the rollers 48 are carried to the wide end of notches 47 and the shaft 43 and members 40 are free to rotate without imparting rotation to gear 39. It is evident that this construction allows torque to be transmitted from gear 39 to shaft 43 by clockwise rotation of said gear. However, when torque transmitted to shaft 43 from the shaft 15 predominates, the shaft 43 will rotate free of gear 39. The operation of this unit in cooperation with the other units of my transmission will be made evident later in this specification.

A gear 49 is secured to shaft 43 by nut 51 which also serves to secure the shaft 43 from longitudinal movement. A shaft 52 rotates on bearing 53 in the end of shaft 43 and on bearing 54 in the end of main housing 23. This shaft 52 is provided with universal joint yoke 55 which is secured to shaft 52 by means of nut 56. Gear and dog-clutch unit 57 is free to slide longitudinally on shaft 52 but is splined thereto. Manually operated means (not shown) makes possible movement of the part 57 to its forward position, engaging dogs 58 in recesses 59 of gear 49. This movement simply serves to connect shafts 43 and 53, the gear portion of part 57 being inactive in this position.

Figure 3:
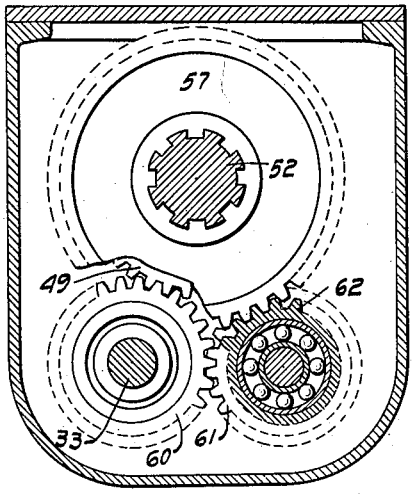
Fig. 3 is a section taken substantially on the line 3—3 of Fig. 1 and showing also a view of gearing directly forward of section 3—3.

The following parts are used to effect reverse operation: (See Fig. 3). Gear 49 meshes with idler gear 60 on a rear extension of shaft 33. This gear 60 meshes with gear 61 which is connected to gear 62 by sleeve 63 all rotating on countershaft 37. When reverse operation is desired the gear 57 is moved back into engagement with gear 62. The connection between shafts 43 and 52 is no longer effected since dogs 58 no longer engage recesses 59 of gear 49. The drive is now from gear 49 to gear 60 to gear 61, to gear 62, to gear 57 and thereby to shaft 52. Manual operation of part 57 may be accomplished by the conventional lever which is not shown.

Figure 4:
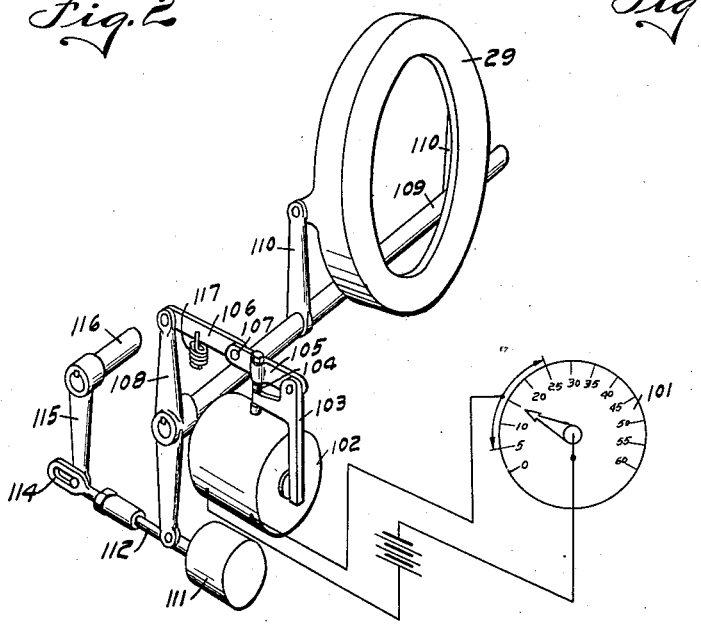
Fig. 4 is a perspective view, more or less diagrammatic, of a control hook-up for my transmission.

Fig. 4 shows a means for operation of the pressure plate 29 to control rotation of the differential housing 16. It is remembered that spring units 30 (Fig. 1) act on pressure plate 29 to compress clutch plates 27 and 28 against surfaces 25 and 26 thereby preventing rotation of differential housing 16. Movement of pressure plate 29 to the left against spring units 30 releases the differential housing 16 and allows it to rotate. In Figure 4 it is understood that links 105 and 106 when in extended unbroken position (as shown) are holding pressure plate 29 out of operation against resistance of spring units 30 through lever 108, shaft 109 and levers 110. At 101 is provided a mechanism operable in proportion to vehicle speed which can be manually set to close an electrical contact at a previously selected vehicle speed. This result may be accomplished by several means well known in the art and no detailed explanation of unit 101 is required herein. The closing of the circuit at 101 causes electromagnet 102 to move lever 103 which acts, by contact with lower end of bolt 104 on link 105, to break joint 107 which connects links 105 and 106. As soon as joint 107 is broken there is no longer any restraint on spring units 30 so they immediately act to bring pressure plate 29 into action, this causing differential housing 16 to be securely held in a stationary position.

A dash-pot unit 111 may be provided to make the transition less abrupt when breaking of joint 107 releases suddenly the spring pressure of units 30.

Shaft 116 (Fig. 4) is connected to the conventional clutch pedal. Depression of the clutch pedal causes shaft 116 to rotate counter-clockwise as viewed in Fig. 4. Such rotation causes lever 115 to exert pressure at 114 and through shaft 112 to rotate shaft 109 and actuate levers 110. This throws pressure plate 29 out of operation. While so held with foot pedal pressure the spring 117 causes the setting of links 105 and 106 to hold plate 29 out of operation until tipped by the electromagnet as previously described.

The slot 114 allows operation of the clutch after the setting of the links 105 and 106 is accomplished.

The operation of my transmission is as follows:

In general the mechanism provides for "low gear" operation when the differential housing 16 is left free to rotate. As has been previously described this is accomplished by mechanism holding pressure ring 29 out of contact with clutch plate 27. All intermediate gear ratios are automatically accomplished in this transmission and the provision for a shift to intermediate is unnecessary. When the car is accelerated to a desired speed it is no longer necessary to allow the housing 16 to rotate and it is therefore stopped entirely and held stationary by pressure plate 29 actuated by spring units 30 as previously described. This cutting out of automatic gear ratio control is arbitrary with the driver or he may set the unit 101 (Fig. 4) to accomplish it automatically at any speed desired. With the differential housing 16 stationary the gear ratio is 1 to 1, the drive going through gears 11, 12 and 14 as a stationary gear train.

In starting a car equipped with my transmission, the clutch pedal is first depressed in the conventional manner. A manually operated lever is used to slide dog clutch unit 57 to its most forward position thereby connecting shafts 43 and 52 (see Fig. 1-rear end of transmission). As shown in Fig. 4 the depression of the clutch pedal also throws pressure plate 29 out of operation and leaves differential housing 16 (Fig. 1) free to rotate. On release of the clutch pedal the transmission is ready to operate in which is generally termed "low gear". Shaft 10, rotated from the source of power, rotates the gear 11 which causes the epicyclic unit, comprised of spider 13, gears 12 and housing 16 to rotate in the same direction as the shaft 10. This rotation of the spider 13, gears 12 and housing 16 is accomplished because of difference in the rate of rotation of gears 11 and 14. If gear 14 were stationary the housing 16 would turn at one-half the rate of shaft 10. However this is not the case as rotation of housing 16 and its attached gear 31 causes the gear train 32, 34, 35 and 39 to operate. The reversal caused by interposing idler 32 causes gear 39 to impart rotation to member 40 and shaft 43 in a direction opposite to that of housing 16 and shaft 10. Shaft 43 is connected to the shaft 15 and shaft 15 rotates gear 14 in a direction also opposite to that of shaft 10 and housing 16. Thus the gear ratio of the countershaft gear train (32, 34, 35 and 39) reflects itself back on the gear 14 and causes housing 16 with spider 13 and gear 12 to turn at a slower rate than would be the case if gear 14 were stationary. This slowing up of the processional movement of the spider 13 tends to allow some drive by the gear 11 directly through gears 12, tending to rotate gear 14. The shaft 15 may therefore rotate faster than the gear 39 because of the slip allowed by the overriding or free-wheeling clutch unit 40. The mechanical advantage (or effective gear ratio) will be decreased as the car accelerates because of the properties of the overriding clutch. The tendency is to slow up housing 16 as the load on the driven shaft becomes less and an effective gear ratio nearer unity will be attained. To better understand this, assume the car on a level pavement starting from a full stop. When the clutch is thrown in the mechanical advantage is a maximum since gear 14 is momentarily stationary. As the wheels begin to turn, the gear 14 and the main drive shaft are rotated through the counter shaft gear train 32, 34, 35 and 39, this increases in rotation of gear 14 and slows up the housing 16, which allows partial drive through gears 12 and shafts 15 and 43 rotate faster than gear 39 and overriding clutch 40 slips to allow this change. By the properties of the differential hook-up the mechanical advantage is reduced when difference in rate of rotation of gears 11 and 14 becomes less. As the car picks up to a constant speed on level road there is a tendency for the load on the driven shaft to decrease. This tendency to "coast" allows the overriding clutch to slip still more and the housing 16 rotation is still further slowed producing still further reduction in gear ratio. The gear ratio assumed is appropriate to the load imposed. Assuming that a steep grade is encountered the rotation of shaft 43 will immediately begin to "lag". This causes the housing 16 to immediately rotate relatively faster and take up the drive of the shaft 43 through the counter-shaft gear train. A greater mechanical advantage is also effected automatically by the properties of the differential hook-up. It is evident that the overriding clutch unit 40 acts as a selector moving the gear ratio toward one end or the other of the available range according as load is increasing or decreasing. Mechanical advantage appropriate to conditions is therefore maintained without necessity for intermediate mechanical shifts.

As stated before a straight 1 to 1 ratio is available to the driver at any speed he desires it by mechanism holding the housing 16 stationary, thus making the automatic feature entirely inactive.

It is evident that various changes, substitutions, variations and modifications might be resorted to, without departing from the spirit and scope of my invention, and hence I do not desire to limit myself to the exact and specific disclosure hereof.

Desiring to protect my invention in the broadest manner legally possible, what I claim and desire to secure by Letters Patent of the United States is:

I claim:

1. In a transmission, the combination, a driving shaft, a driven shaft, oppositely disposed gears secured one to each of said shafts, an epicyclic gear unit rotatable by differential action between said oppositely disposed gears, a gear train connecting said epicyclic unit with said driven shaft, and a torque operated clutch unit in said gear train.

2. In a transmission, the combination, a driving shaft, a driven shaft, oppositely disposed gears secured onto each of said shafts, an epicyclic gear unit rotatable by differential action between said oppositely disposed gears, a gear train connecting said epicyclic unit with said driven shaft, one gear of said train provided with a clutch causing disengagement of said train when rate of rotation of said driven shaft tends to exceed rate of rotation imparted by said train.

3. In a transmission the combination, a driving shaft, a driven shaft, oppositely disposed gears secured one to each of said shafts, an epicyclic gear unit rotatable by differential action between said oppositely disposed gears, a gear train connecting said epicyclic gear unit with said driven shaft, an idler in said gear train causing rotation of said driven shaft in a direction opposite to the direction of rotation of said epicyclic gear unit.

4. In a transmission, the combination, a driving shaft, a driven shaft, oppositely disposed gears secured one to each of said shafts, an epicyclic gear unit rotatable by differential action between said oppositely disposed gears, a gear train connecting said epicyclic gear unit with said driven shaft, an idler in said gear train causing rotation of said driven shaft in a direction opposite to the direction of rotation of said epicyclic gear unit, one gear of said train provided with a clutch causing disengagement of said train when rate of rotation of said driven shafts tends to exceed rate of rotation imparted by said train.

5. In a gear-change mechanism in combination, a driving shaft, a driven shaft, a differential gear train connected between said driving and said driven shafts, a rotatable housing for said differential gear train, a primary differential gear rotatable within said housing and connected with said driving shaft, a secondary differential gear also rotatable within said housing and connected with said driven shaft, the epicyclic unit of said differential gear train connected with said housing and rotatable therewith, a countershaft gear train connecting said housing with said driven shaft, a clutch in said countershaft gear train providing disengagement of said train when rate of rotation of said driven shaft tends to exceed rate of rotation imparted by said train.

6. In a mechanism providing for change of gear ratio, the combination, a rotatable housing, a differential gear train enclosed in said housing, said differential gear train interposed between a driving and driven shaft, an element of said differential gear train connected with said housing and rotatable by differential action of said driving and driven shafts, a countershaft gear train connecting said housing with said driven shaft, means preventing rotation of said housing and said countershaft gear train thereby providing high gear operation, means allowing rotation of said housing and said countershaft gear train thereby providing low gear operation.

7. In a power transmission mechanism, a means providing a variable mechanical advantage comprising, a driving shaft, a driven shaft, a unit rotatable by difference in rotation of said driving shaft and said driven shaft, a secondary connecting means providing mechanical advantage between said rotatable unit and said driven shaft, a torque operated clutch in said secondary connecting means in cooperative action with said rotatable unit and said driven shaft producing a variation in mechanical advantage substantially in proportion to the load on said driven shaft.

8. In a power transmission mechanism, a means providing a variable mechanical advantage comprising, a driving shaft, a driven shaft, a unit rotatable by difference in rotation of said driving shaft and said driven shaft, a secondary connecting means providing mechanical advantage between said rotatable unit and said driven shaft, a clutch between said secondary means and said driven shaft, said clutch so constructed as to disengage when rate of rotation of said driven shaft tends to exceed rate of rotation imparted by said secondary means, said secondary means in cooperative action with said rotatable unit said clutch and said driven shaft producing a variation in mechanical advantage substantially in proportion to the load on said driven shaft.

9. In a power transmission mechanism, a means providing variable mechanical advantage comprising, a sectional shaft, a unit rotatable by difference in rotation of two sections of said shaft, a secondary means providing mechanical advantage between said rotatable unit and one of said shaft sections, a clutch connection interposed in said secondary means, said clutch provided with means to disengage when rate of rotation of said shaft section tends to exceed rate of rotation imparted by said secondary means.

10. In a power transmission mechanism, a drive shaft, an epicyclic unit rotated by differential action between sections of said shaft, secondary rotating means connecting said epicyclic unit with one of said shaft sections, a contacting member movable to prevent rotation of said epicyclic unit, pressure means actuating said contacting member, mechanism holding said contacting member out of operation against said pressure means, a trip mechanism to release said contacting member, means actuated by vehicle speed for control of said trip mechanism.

11. In an automotive transmission, a rotatable differential housing providing low gear operation, a contacting member movable to prevent rotation of said differential housing to provide high gear operation, pressure means actuating said contacting member mechanism holding said contacting member out of operation against said pressure means, a trip mechanism to release said contacting member, means for control of said trip mechanism.

12. In an automatic transmission, a sectional drive shaft, a differential gear train interposed between sections of said drive shaft, a secondary gear train connecting a unit of said differential gear train with a section of said drive shaft, a torque operated clutch in said secondary gear train.

13. In an automatic transmission, a sectional drive shaft, a differential gear train interposed between sections of said drive shaft, a secondary gear train connecting a unit of said differential gear train with a section of said drive shaft, and a free wheeling clutch connection in said secondary gear train.

14. In a transmission, a driving shaft, a driven shaft, a differential gear train interposed between said driving and said driven shaft, a secondary gear train rotated by a unit of said differential gear train, a torque responsive clutch automatically operable to connect said secondary gear train with said driven shaft.

15. In a transmission, a driving shaft, a driven shaft, an epicyclic unit rotatable by differential action between said driving shaft and said driven shaft, a secondary gear train rotated by said epicyclic unit, a torque operated clutch effecting a driving connection between said secondary gear train and said driven shaft.

16. In a transmission, a driving shaft, a driven shaft, an epicyclic unit rotatable by differential action between said driving shaft and said driven shaft, a secondary gear train rotated by said epicyclic unit, a clutch operated by the torque transmitted in said secondary gear train and effecting a selective driving connection between said secondary gear train and said driven shaft.

17. In a power transmission mechanism providing for automatic change of mechanical advantage, a driving shaft, a driven shaft, an epicyclic unit rotatable by differential action of said driving shaft and said driven shaft, a contacting member movable to prevent rotation of said epicyclic unit, secondary means connecting said epicyclic unit to said driven shaft a torque operated clutch in said secondary connecting means.

KARL WEIHMANN.